(12) United States Patent
Blyer et al.

(10) Patent No.: US 10,730,573 B2
(45) Date of Patent: Aug. 4, 2020

(54) BICYCLE SEAT ATTACHMENT DEVICE

(71) Applicants: Jonathan Blyer, Brooklyn, NY (US);
Colin Arthur Tanner, Brooklyn, NY (US)

(72) Inventors: Jonathan Blyer, Brooklyn, NY (US);
Colin Arthur Tanner, Brooklyn, NY (US)

( * ) Notice: Subject to any disclaimer, the term of this patent is extended or adjusted under 35 U.S.C. 154(b) by 0 days.

(21) Appl. No.: 16/134,069

(22) Filed: Sep. 18, 2018

(65) Prior Publication Data

US 2019/0084636 A1 Mar. 21, 2019

Related U.S. Application Data

(60) Provisional application No. 62/559,829, filed on Sep. 18, 2017.

(51) Int. Cl.
*B62J 1/08* (2006.01)
*F16B 2/12* (2006.01)
*F16B 5/02* (2006.01)

(52) U.S. Cl.
CPC . *B62J 1/08* (2013.01); *F16B 2/12* (2013.01); *F16B 5/0216* (2013.01)

(58) Field of Classification Search
CPC .............. B62J 1/08; F16B 5/0216; F16B 2/12
See application file for complete search history.

(56) References Cited

U.S. PATENT DOCUMENTS

| | | | | |
|---|---|---|---|---|
| 5,228,796 A * | 7/1993 | Kao | ............................ | B62J 1/08 248/231.31 |
| 5,664,829 A * | 9/1997 | Thomson | .................... | B62J 1/08 297/195.1 |
| 6,174,027 B1 * | 1/2001 | Lemmens | .................. | B62J 1/00 297/215.13 |
| 8,911,012 B2 * | 12/2014 | Choi | .......................... | B62J 1/04 297/215.15 |
| 9,630,668 B1 | 4/2017 | Lee | | |
| 2007/0286671 A1 | 12/2007 | Meggiolan | | |
| 2016/0001835 A1 | 1/2016 | Wodjewodzki | | |

* cited by examiner

*Primary Examiner* — Milton Nelson, Jr.
(74) *Attorney, Agent, or Firm* — Libby Baby Varghese

(57) ABSTRACT

A bicycle seat attachment device for attaching a bicycle seat to a bicycle seat post is disclosed having a pin and a receiver. The pin has an upper pin and a lower pin that are dimensioned and configured to receive rails of the bicycle seat. The receiver is disposed on the bicycle seat post. The lower pin has a depending male portion that is dimensioned and configured to a female central opening of a receiver. The female central opening extends between a top surface and a bottom surface of the receiver. The depending male portion rotates within the female central opening between a restricted position and a release position. In the restricted position, the male portion locks the bicycle seat to the receiver and when the male portion is in a release position, the bicycle seat is releasable from the receiver.

9 Claims, 6 Drawing Sheets

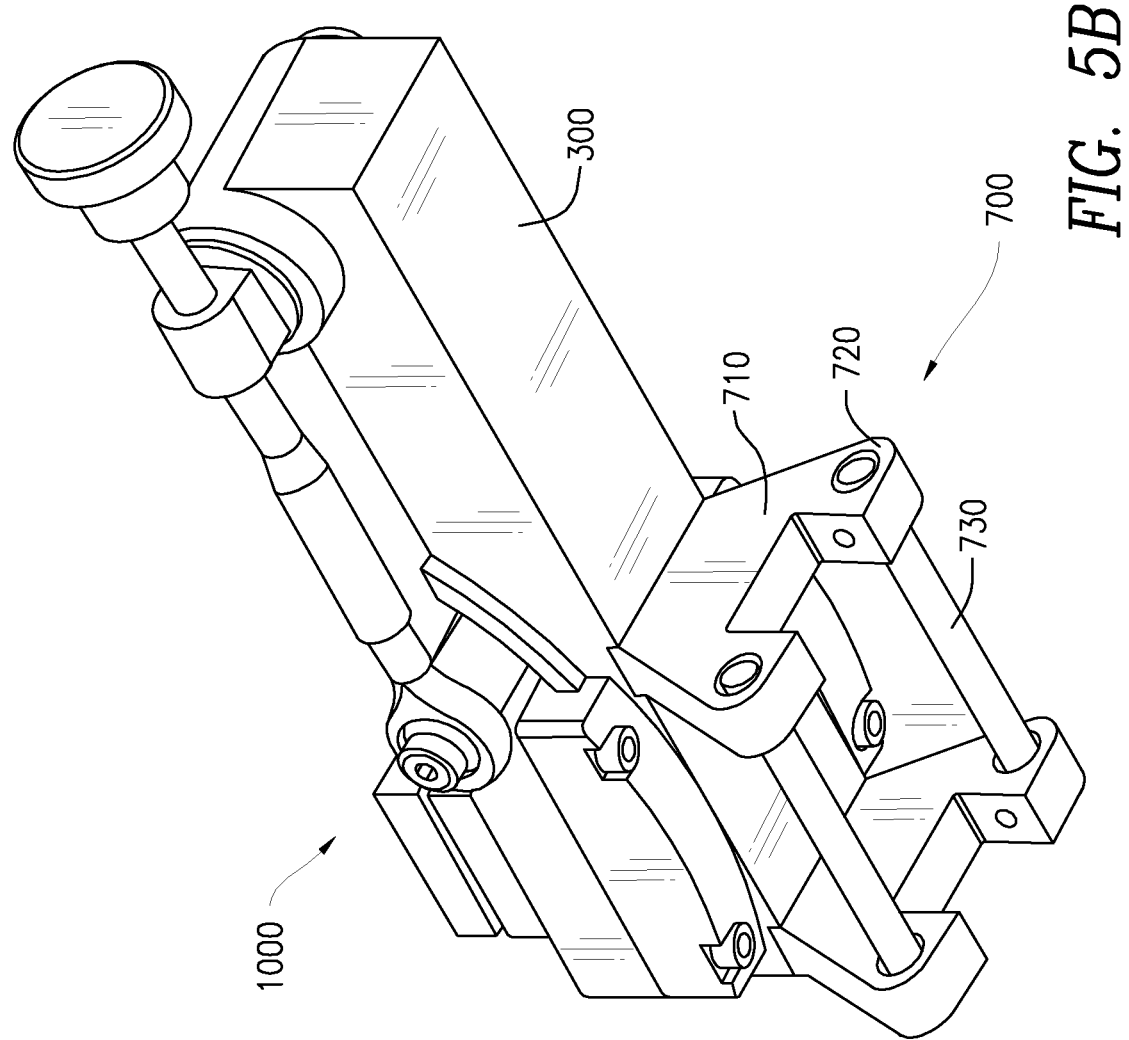

BICYCLE SEAT ATTACHMENT DEVICE

PRIORITY AND RELATED APPLICATION

This application claims priority to U.S. Provisional Patent Application Ser. No. 62/559,829 filed Sep. 18, 2017, entitled "QUICK ATTACHMENT DEVICE FOR BICYCLE SEATS," which is hereby incorporated by reference in its entirety.

FIELD OF THE INVENTION

The present invention relates in general to bicycle saddle installation mechanisms. In particular, the present invention relates to a device that allows for a bicycle saddle to be quickly attached and/or removed from a stationary or non-stationary bicycle and quickly adjusted when attached.

BACKGROUND OF THE INVENTION

Finding the proper spatial relationship between a cyclist's hands, feet and buttocks is key to preserving bicycle riding enjoyment and preventing injury to the cyclist. This is true whether the cyclist is a beginner or a professional or the bicycle is stationary or non-stationary. Often, when a cyclist is introduced to a new bicycle, adjustments are made to the relative location of the handlebar, pedals and seat. These adjustments are used to minimize discomforts and the chance for a repetitive stress injury and to maximize performance and speed.

Arguably a key aspect of ensuring that the bicycle-human relationship works harmoniously is to place a comfortable seat under the rider. Seat preference is highly personal. While there are many gimmicks on the marketplace to help cyclists find seats that will be comfortable, the best selection method is a trial and error process, performed quickly so the cyclist may compare and contrast one seat to another. Accordingly, a need exists for a bicycle seat mounting mechanism that permits bicycle seats to be installed and removed rapidly, easily and safely on a stationary or non-stationary bicycle. Typical bicycle seat attachment mechanisms do not allow for quick or easy changes of bicycle seats. Though prior art seat attaching mechanisms exist that allow for quick and easy seat changes such prior art devices are complex, and larger than desirable. Operating the prior art can be difficult and also dangerous. Prior art is also restrictive in the ability to easily be used with saddle rails of different shapes. What is desired is an actual quick attachment and release device that is also safe, not very large, simple to operate by a user and that can be easily adopted to saddles with rails of different shapes on stationary bikes and non-stationary bikes.

What is desired is a bicycle seat attachment device that allows for a quick and simple change of the seat. A device having a two-part interlocking member, such as a pin and receiver, would allow for the bicycle seat to be installed quickly and simply. A device is desired where one interlocking member is fixed to the bicycle and the other interlocking member is fixed to the bicycle seat thereby creating a quick and easy attachment method. A device is further desired that may allow for the tilt of the seat to be adjusted in different ways.

DESCRIPTION OF THE DRAWINGS

FIG. 5B shows a bottom perspective view of the embodiment shown in FIG. 5A.

DETAILED DESCRIPTION OF THE INVENTION

While certain embodiments and applications of this invention will be shown and described below, it will be apparent to those skilled in the art that many more modifications are possible without departing from the inventive concepts that will be described herein. The invention, therefore, is not to be restricted except as is necessary by the prior art.

Figure 1:
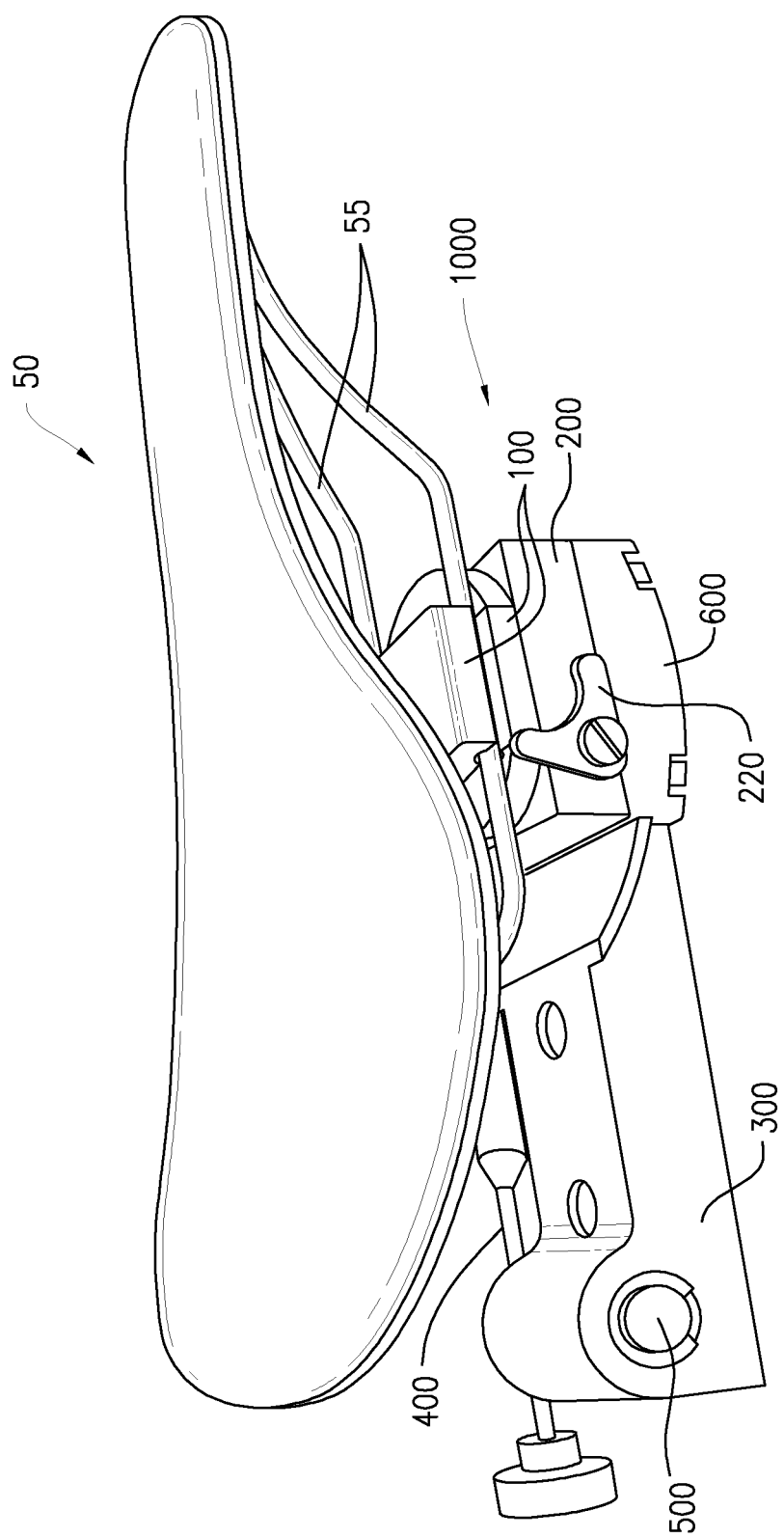
FIG. 1 shows a perspective view of a bicycle seat attachment device of the present invention.

FIG. 1 shows a quick attachment device 1000 for a bicycle seat 50. The device 1000 releasably attaches to bicycle rails 55 of the bicycle seat 50. The device 1000 comprises a pin 100, a receiver 200, base 300, rocker bushing 600 and turnbuckle 400. A latch 220 is disposed on the side of the receiver 200. The receiver 200 is disposed on rocker bushing 600 that is connected at a first base end 330 of base 300. At a second base end 310 of base 300 is a base bore 318 for receiving a linkage pin 500 which supports turnbuckle 400. See FIG. 3.

Figure 2:
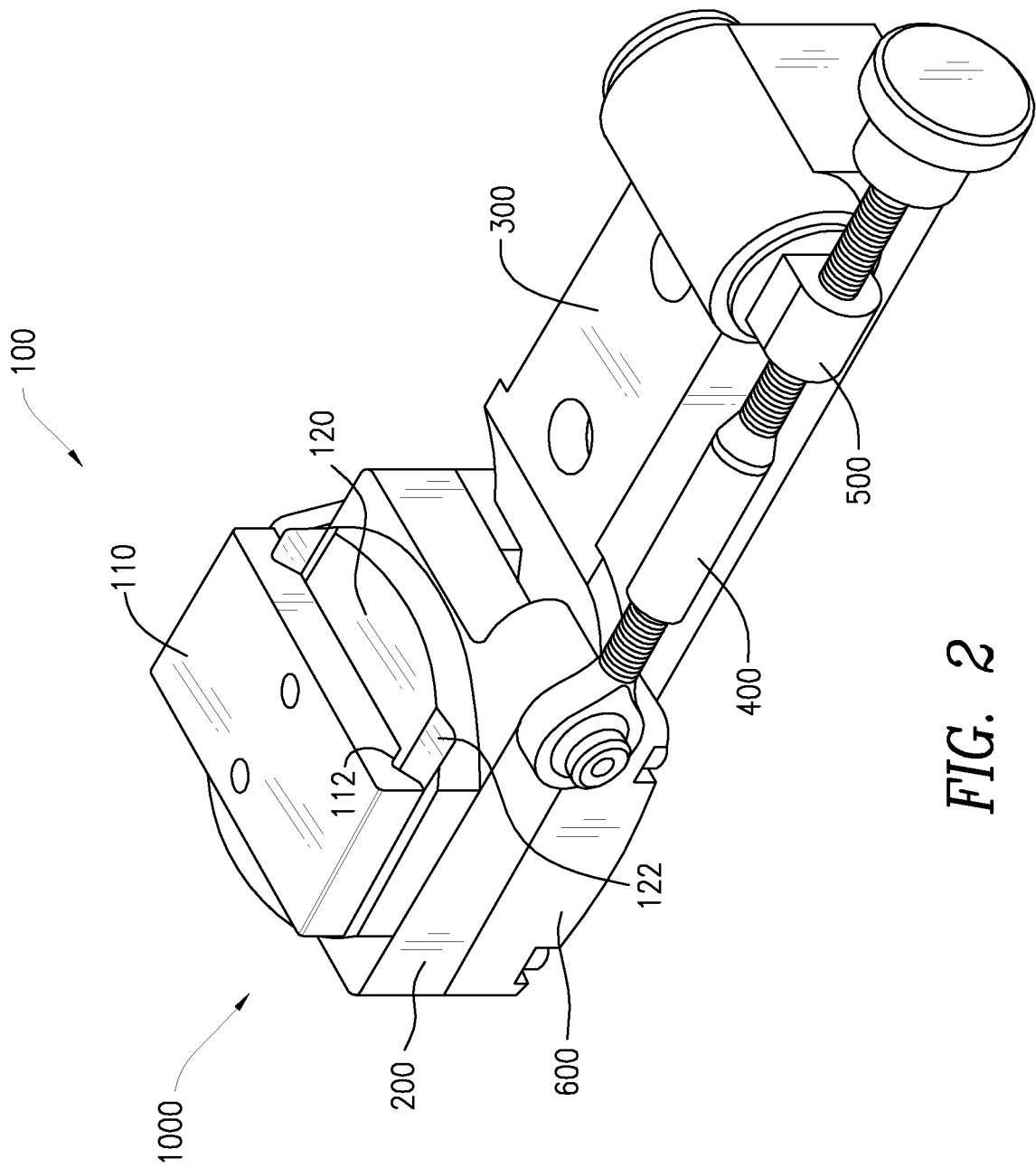
FIG. 2 shows a top perspective view of the present invention with the bicycle seat removed.
Figure 3:
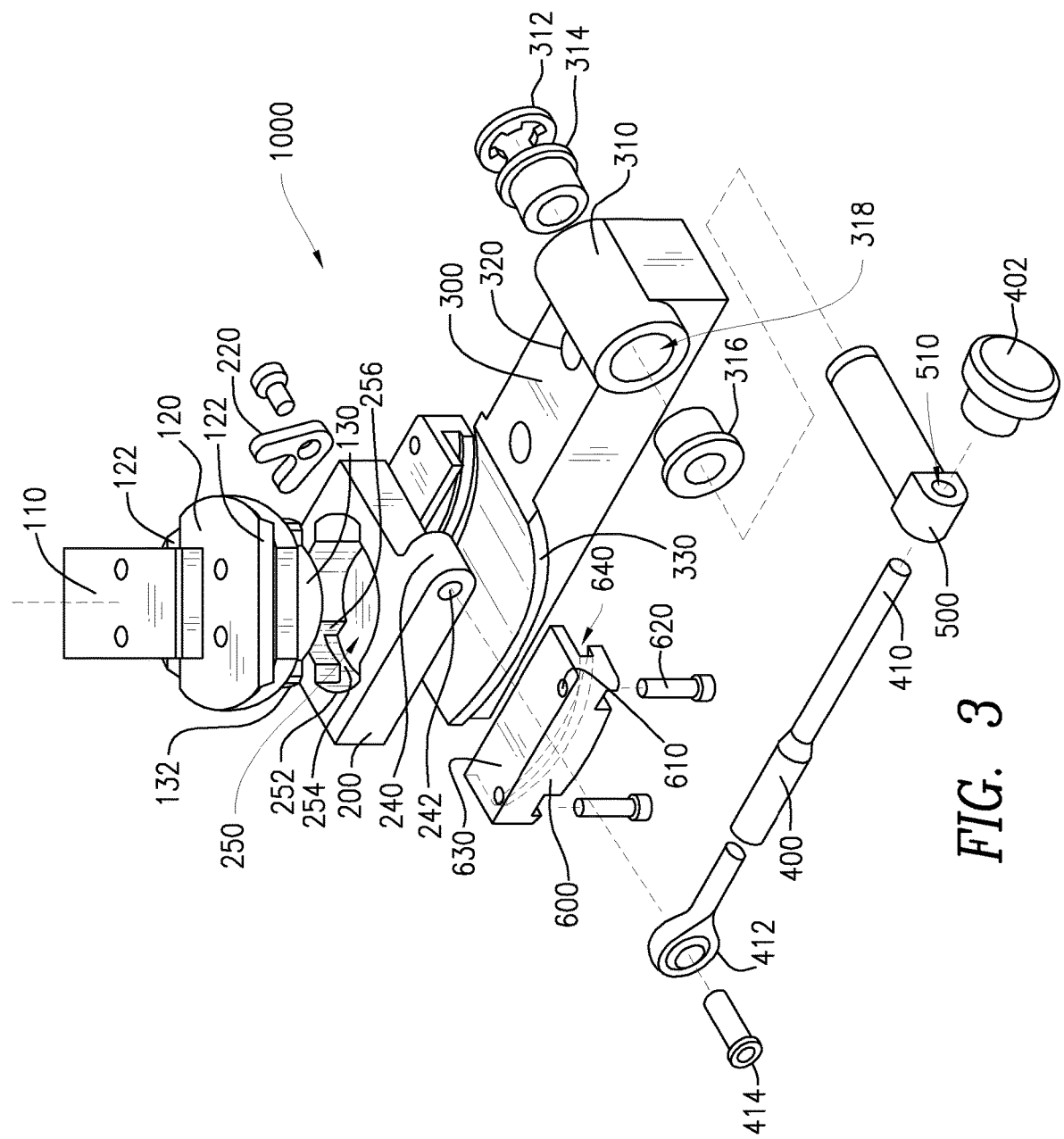
FIG. 3 shows an exploded top perspective view of the invention as shown in FIG. 2.

Referring now to FIGS. 2 and 3, the device 1000 is shown from an opposite side view than of the side shown in FIG. 1. Also, FIG. 3 shows device 1000 in an exploded view. Here the turnbuckle 400 is shown having a second turnbuckle end 410 with a knob 402 and a first turnbuckle end 412. The first turnbuckle end 412 is mounted to receiver bore 242 at receiver end 240 by an attachment 414 disposed therethrough. The second turnbuckle end 410 is disposed through linkage bore 510 of linkage pin 500. The linkage pin 500 is disposed through the base bore 318 using attachment accessories 312, 314 and 316.

The base 300 has post bores 320 to mount said base 300 to a mating feature of a bicycle (not shown). Bicycle, when used herein, will refer to either a stationary or non-stationary bicycle. The first base end 330 of the base 300 has an arched track which is dimensioned and configured to receive rocker bushing 600. Rocker bushing 600 is shown as a pair and flanks the two sides of the arched track. Each rocker bushing 600 has curved rocker channel 640 that corresponds to the arch of the track at the first base end 330. A top surface 630 of rocker bushing 600 is mounted to a bottom surface of said receiver 200 using attachments 620 that enter through bores 610.

The receiver 200 is disposed on the bicycle on a seat post (not shown) via the base 300 and the rocker bushing 600. The seat post refers to a post on a non-stationary bicycle and a seat attachment mechanism on a stationary bike. The receiver 200 has a female central opening 250 extending between a top surface and said bottom surface of the receiver 200. The female central opening 250 is generally cylindrically-shaped and has radially extending tabs therefrom forming lug channel openings 252. The lug channel openings 252 are opposite each other and are disposed at the corners of the receiver 200. Each lug channel opening 252 is disposed at a first end of a lug channel 254 with a lug channel stop surface 256 being disposed at a second end of the lug channel.

Figure 4:
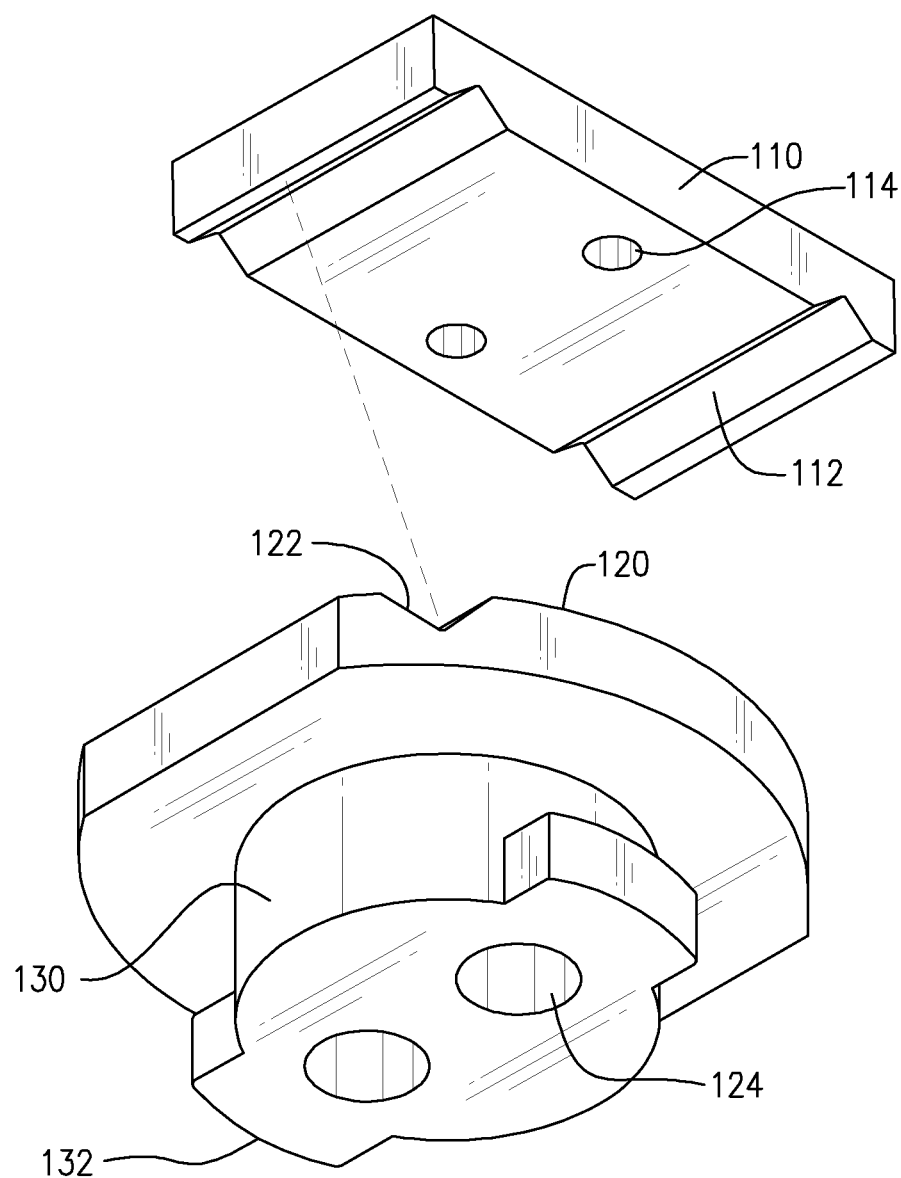
FIG. 4 shows an exploded bottom perspective of the pin of the present invention.

The receiver 200 is designed to releasably hold pin 100. The pin 100 comprises upper pin 110 and lower pin 120. See FIG. 4. The upper pin 110 has threaded bores 114 extending between an upper surface and an opposing bottom surface. Grooves 112 are disposed on the bottom surface of the upper pin 110.

Lower pin 120 has upper surface and an opposing bottom surface. At the upper surface of the lower pin 120 are bores 124 and grooves 122. Grooves 122 correspond to grooves 112 of the upper pin 110. When the upper pin 110 and the lower pin 120 are joined, they form a clamping mechanism. Specifically, the bottom surface of the upper pin 110 and the upper surface of the lower pin 120 abut each other and each groove, 112, 122, of upper pin 110 and of lower pin 120, respectively, align to form channels. These channels are dimensioned and configured to receive rails 55 of the bicycle seat 50. The channels are easily adapted to seat rails of different sizes ranging anywhere from about 7 mm diameter to about 10 mm diameter. The pin 100 will work equally well with all sizes, allowing for the use of seat 50 with different shaped rails 55 to be tested with ease. The upper pin 110 and lower pin 120 are releasably fixed to each other via attachments disposed through bores 114 and bores 124, which align and correspond to each other.

At the bottom surface of the lower pin 120 is a depending male portion 130. Bores 124 extend between the upper surface and bottom surface of the lower pin 120 and through the male depending portion 130. The male portion 130 is disposed in the center of the lower pin 120 and is cylindrical in shape. A free end of the male portion 130 is furthest away from the bottom surface of the lower pin 120. Opposing lugs 132 flank the free end of the male portion 130. Lugs 132 are largely rectangular in shape and are radially outwardly extending. Two lugs are shown in the figures, however the invention may be used with other embodiments such as any number of lugs and any shape of lugs. Once the mating features of the pin 100 and receiver 200 are aligned, pin 100 is lowered into receiver 200 and then pin 100 is rotated to place the bicycle seat forwards.

In use, when the rails 55 of the seat 50 are held by upper pin 110 and lower pin 120, the male depending portion 130 and lugs 132 are positioned to align with the female central opening 250 and the lug channel opening 252, respectively, to releasably connect the pin 100 to the receiver 200. Specifically, the pin 100 is inserted vertically into the receiver 200 and then rotated about the vertical axis. The lugs 132 are opposing tabs that interlock with receiver 200 to positively locate the seat 50 angularly, pointed forwards and to transfer forces from the pin 100 to the receiver 200. More specifically, lugs 132 are inserted in the lug channel openings 252 and the male depending portion 130 is rotated such that the lugs 132 slide in the lug channel 254 until lugs 132 engage lug channel stop surface 256 at the second end of the lug channel 254.

The pin 100 is then secured in the receiver 200. Thus, the depending male depending portion 130 rotates between a restricted position and a release position. The restricted position is realized when said lugs 132 abut the lug channel stops 256. The release position is realized when the lugs 132 sit within the lug channel openings 252.

It should be noted that to further immobilize the pin 100 once the lugs 132 abut the lug channel stops 256 in the receiver 200, the latch 220 is moved to a lock position as shown in FIG. 1. The latch 220 engages or abuts the side wall of pin lower 120 to prevent the pin 100 from rotating freely. Thus, when the pin 100 is attached to the rails 55, the bicycle seat 50 can be locked to a stationary or non-stationary bicycle seat post (not shown) and made immobile by moving the latch 220 to a lock position once the male depending portion 130 is in a restricted position and the latch 220 is in said lock position. The latch 220 may be held in place with a small magnet (not shown) disposed in a side wall of receiver 200.

When the latch 220 clears or is moved away from the lower pin 120, the latch 220 is disposed in an unlocked position. In this unlocked position, the pin 100 is detachable from the receiver 200 and thus the male depending portion 130 is in a release position. Consequently, when the pin 100 is attached to the rails 55, the bicycle seat 50 is releasable from the receiver 200 and thus the bicycle. As apparent from the description, the installation or removal of a seat 50 using the pin 100 and receiver 200 requires no tools to be used, screws to be tightened or cams to be operated. The device 1000 allows for rapid and simple installation of bicycle seat 50 to a bicycle. This is enabled by having support rails 55 of a bicycle seat 50 both quickly and easily interface with grooves 112, 122 defined between lower pin portion 110 and upper pin portion 120.

Once the pin 100 and receiver 200 of the device 1000, secures the seat 50 to the bicycle, the turnbuckle 400 will be used to adjust and maintain the seat position and allow for seat tilting capabilities. As shown in FIGS. 2 and 3, the turnbuckle 400 is supported by the linkage pin 500. Knob 402 of the turnbuckle 400 is used to turn the turnbuckle 400 so that the receiver 200 coupled with the rocker bushing 600 is moved along the track 330 of the base 300. Movement of receiver 200 moves the seat 50 anywhere between a first end to a second end of the track 330. The position of the receiver 200 and pin 100 relative to the horizon will adjust the angle the seat 50. Thus, the force from the turnbuckle 400 slides said receiver 200 via the rocker bushings 600 along said arched track 330 which in turn moves the bicycle seat 50 held within the pin 100 and the receiver 200. The arched track 330 has been dimensioned to be approximately concentric with the center of the top surface of seat 50, thereby minimizing forward and backward movement of the seat 50 as well as vertical movement of the center of the seat 50 when adjusting the orientation with respect to the horizon.

Figure 5A:
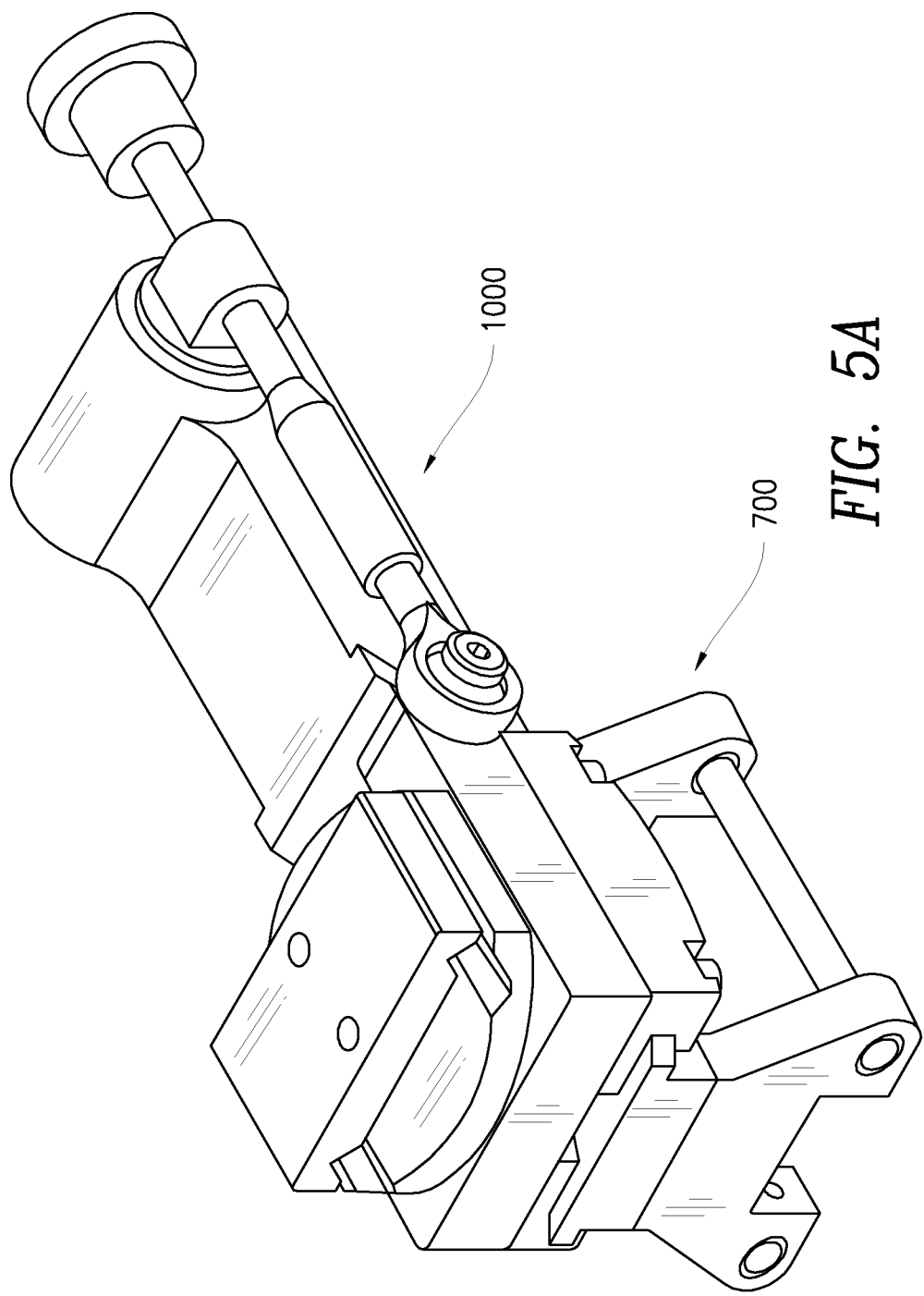
FIG. 5A shows a top perspective view of a second embodiment of the present invention.

Looking now to FIGS. 5A and 5B, another embodiment of device 1000 is shown to include a universal base connector 700. Universal base connector 700 is connected to a bottom surface of the base 300. Universal base connector 700 has vertical supports 710 and cylindrical rails 730 at the bottom and between vertical supports 710. The cylindrical rails 730 connect to vertical supports 710 through bores 720. The cylindrical rails 730 have dimensions similar to standard bicycle seat rails. For instance, standard bicycle seat rails may be about 7 mm diameter and about 44 mm apart. Thus, cylindrical rails 730 allow the device 1000 to mount easily to any bicycle, stationary or non-stationary, in place of a bicycle seat, in order to permit quick and safe saddle changes. Rails 730 attach to a bicycle, stationary or non-stationary, using the attachment mechanism of the bicycle that would normally be used to clamp the seat rails.

As stated above, the embodiment shown in the description is one embodiment and other embodiments may be envisioned. For instance, said interlocking interfaces may be male and female interlocking parts as described above, slide and groove interlocking parts and so on. In one embodiment, the pin may be disposed on the bike and the receiver on the bike seat. In another embodiment, said pin and said receiver may have different interlocking interfaces than those explicitly described herein. Examples of different interlocking interfaces could be a square or rectangle shaped pin mated to a square or rectangle shaped aperture in the receiver, as well as an infinite amount of other shapes. The exact method of insertion of the pin into the receiver may vary with different styles of interlocking mechanisms.

We claim:

1. A bicycle seat attachment device comprising:
   a pin, said pin having an upper pin and a lower pin, said upper pin and lower pin dimensioned and configured to receive rails of a bicycle seat, said lower pin having a depending male portion; and
   a receiver adapted to be disposed on a bicycle seat post, the receiver having a top surface and an opposing bottom surface, said receiver having a female central opening extending between said top surface and said bottom surface, said female central opening dimensioned and configured to receive said depending male portion, said depending male portion rotating between a restricted position and a release position, wherein when said depending male portion is in the restricted position, the bicycle seat is lockable to the receiver and when said depending male portion is in the release position, the bicycle seat is releasable from the receiver.

2. The device of claim 1, wherein the upper pin and said lower pin each have a groove, wherein when said upper pin and said lower pin are joined, each said groove forms a channel, wherein said channel of said pin is dimensioned and configured to receive said rails of the bicycle seat.

3. The device of claim 1, wherein the male depending portion is cylindrically shaped having a free end.

4. The device of claim 3, further comprising at least one lug disposed on said free end of the male depending portion, said lug being radially outwardly extending.

5. The device of claim 4, wherein a lug channel is disposed at the female central opening, wherein said lug channel at a first end has a lug channel opening and said lug channel at a second end has a lug channel stop surface.

6. The device of claim 4, further comprising a latch, said latch having a lock position and an unlock position, wherein when said depending male part is in the restricted position said latch is disposed in said lock position to lock and immobilize said bicycle seat to the receiver, and wherein when said depending male part is in the releasable position said latch is disposed in said unlock position to unlock said bicycle seat and make said bicycle seat releasable from the receiver.

7. A bicycle seat attachment device comprising:
   a pin, said pin having an upper pin and a lower pin, said upper pin and lower pin dimensioned and configured to receive rails of a bicycle seat, said lower pin having a depending male portion;
   a receiver, the receiver having a top surface and an opposing bottom surface, said receiver having a female central opening extending between said top surface and said bottom surface, said female central opening dimensioned and configured to receive said depending male portion, said depending male portion rotating between a restricted position and a release position;
   a rocker bushing, said rocker bushing having a rocker channel, said rocker bushing mounted to said receiver;
   a base disposed on a bicycle seat post, said base having a first base end and a second base end, said first base end having a track and said second base end having a bore, wherein said rocker bushing is disposed on said first base end; and
   a turnbuckle having a first turnbuckle end and a second turnbuckle end, said second turnbuckle end mounted to said second base end, said first turnbuckle end mounted to said receiver, wherein force from the turnbuckle slides said receiver along said track which in turn moves the bicycle seat held within the pin and the receiver, wherein when said depending male portion is in the restricted position the bicycle seat is lockable to the receiver and when said depending male portion is in the release position the bicycle seat is releasable from the receiver.

8. The device of claim 7, wherein said rocker bushing is dimensioned and configured to said track of said base.

9. The device of claim 7, further comprising a latch, said latch having a lock position and an unlock position, wherein when said depending male part is in the restricted position said latch is disposed in said lock position to lock and immobilize said bicycle seat to the receiver, and wherein when said depending male part is in the releasable position said latch is disposed in said unlock position to unlock said bicycle seat and make said bicycle seat releasable from the receiver.

* * * * *